United States Patent
Hattendorf et al.

(10) Patent No.: US 10,196,721 B2
(45) Date of Patent: Feb. 5, 2019

(54) HEAT-RESISTANT IRON-CHROMIUM-ALUMINUM ALLOY WITH LOW CHROMIUM VAPORIZATION RATE AND ELEVATED THERMAL STABILITY

(75) Inventors: Heike Hattendorf, Werdohl (DE); Bernd Kuhn, Alsdorf (DE); Thomas Eckardt, Cologne (DE); Tilmann Beck, Juelich (DE); Willem Quadakkers, EG Wijnandsrade (NL); Werner Theisen, Hattingen (DE); Nilofar Nabiran, Bochum (DE)

(73) Assignee: VDM Metals International GmbH, Werdohl (DE)

(*) Notice: Subject to any disclaimer, the term of this patent is extended or adjusted under 35 U.S.C. 154(b) by 272 days.

(21) Appl. No.: 14/127,990

(22) PCT Filed: Jun. 6, 2012

(86) PCT No.: PCT/DE2012/000609
§ 371 (c)(1),
(2), (4) Date: Mar. 27, 2014

(87) PCT Pub. No.: WO2012/175067
PCT Pub. Date: Dec. 27, 2012

(65) Prior Publication Data
US 2014/0219855 A1    Aug. 7, 2014

(30) Foreign Application Priority Data

Jun. 21, 2011 (DE) .................... 10 2011 111 703
Mar. 6, 2012 (DE) .................... 10 2012 004 488

(51) Int. Cl.
H01M 8/0206 (2016.01)
C22C 38/52 (2006.01)
(Continued)

(52) U.S. Cl.
CPC ............ *C22C 38/52* (2013.01); *C22C 38/001* (2013.01); *C22C 38/002* (2013.01);
(Continued)

(58) Field of Classification Search
CPC ..... C22C 38/52; C22C 38/001; C22C 38/002; C22C 38/004
(Continued)

(56) References Cited

U.S. PATENT DOCUMENTS

| 4,859,649 A | 8/1989 | Boehnke et al. |
| 5,228,932 A | 7/1993 | Shimizu et al. |

(Continued)

FOREIGN PATENT DOCUMENTS

| CN | 1662666 A | 8/2005 |
| DE | 199 28 842 A1 | 1/2001 |

(Continued)

OTHER PUBLICATIONS

Teruhisa Horita et al., "Evaluation of Laves-phase forming Fe—Cr alloy for SOFC interconnects in reducing atmosphere." Journal of Power Sources 176, pp. 54-61. (Year: 2008).*

(Continued)

Primary Examiner — Patricia L. Hailey
(74) Attorney, Agent, or Firm — Collard & Roe, P.C.

(57) ABSTRACT

An iron-chromium-aluminum alloy with improved heat resistance, low chromium vaporization rate and good processability, comprising (in % by mass), 2.0 to 4.5% Al, 12 to 25% Cr, 1.0 to 4% W, 0.25 to 2.0% Nb, 0.05 to 1.2% Si, 0.001 to 0.70% Mn, 0.001 to 0.030% C, 0.0001 to 0.05% Mg, 0.0001 to 0.03% Ca, 0.001 to 0.030% P, max. 0.03% N, max. 0.01% S, remainder iron and the usual melting-related impurities.

12 Claims, 5 Drawing Sheets

(51) Int. Cl.
C22C 38/00 (2006.01)
C22C 38/22 (2006.01)
C22C 38/26 (2006.01)
H01M 8/021 (2016.01)
C22C 38/02 (2006.01)
C22C 38/04 (2006.01)
C22C 38/06 (2006.01)
C22C 38/42 (2006.01)
C22C 38/44 (2006.01)
C22C 38/48 (2006.01)
C22C 38/50 (2006.01)

(52) U.S. Cl.
CPC .......... *C22C 38/004* (2013.01); *C22C 38/005* (2013.01); *C22C 38/02* (2013.01); *C22C 38/04* (2013.01); *C22C 38/06* (2013.01); *C22C 38/22* (2013.01); *C22C 38/26* (2013.01); *C22C 38/42* (2013.01); *C22C 38/44* (2013.01); *C22C 38/48* (2013.01); *C22C 38/50* (2013.01); *H01M 8/021* (2013.01); *C21D 2211/004* (2013.01); *C21D 2211/005* (2013.01); *Y02P 70/56* (2015.11)

(58) Field of Classification Search
USPC .......................................................... 420/37
See application file for complete search history.

(56) References Cited

U.S. PATENT DOCUMENTS

| | | | | |
|---|---|---|---|---|
| 5,312,700 | A | * | 5/1994 | Ishida .................. H01M 8/2425 429/481 |
| 5,578,265 | A | | 11/1996 | Ericson et al. |
| 5,733,682 | A | * | 3/1998 | Quadakkers ........ H01M 8/0204 429/210 |
| 6,936,217 | B2 | | 8/2005 | Quadadakkers et al. |
| 8,580,190 | B2 | | 11/2013 | Hattendorf |
| 2004/0131493 | A1 | | 7/2004 | Hattendorf et al. |
| 2005/0076976 | A1 | * | 4/2005 | Ide ....................... C21D 8/0205 148/609 |
| 2005/0211348 | A1 | * | 9/2005 | Miyazaki ................ C21D 6/002 148/609 |
| 2007/0110609 | A1 | | 5/2007 | Hattendorf et al. |
| 2007/0144634 | A1 | | 6/2007 | Miyazaki et al. |
| 2009/0104494 | A1 | | 4/2009 | Quadakkers et al. |
| 2009/0117414 | A1 | * | 5/2009 | Ringel ................ H01M 8/0208 429/468 |
| 2009/0202383 | A1 | * | 8/2009 | Tanaka .................. C22C 38/004 420/83 |
| 2012/0145285 | A1 | | 6/2012 | Hattendorf et al. |

FOREIGN PATENT DOCUMENTS

| | | |
|---|---|---|
| DE | 100 25 108 A1 | 11/2001 |
| DE | 101 57 749 A1 | 10/2002 |
| DE | 103 10 865 B3 | 5/2004 |
| DE | 10 2006 007 598 A1 | 8/2007 |
| DE | 10 2009 039 552 A1 | 3/2011 |
| DE | 20 2011 106 778 U1 | 12/2011 |
| EP | 0 290 719 A1 | 11/1988 |
| EP | 0 516 097 A1 | 12/1992 |
| EP | 0 516 267 A1 | 12/1992 |
| EP | 0 597 129 A1 | 5/1994 |
| EP | 1 298 228 A1 | 4/2003 |
| EP | 1 536 031 A1 | 6/2005 |
| EP | 1 882 756 A1 | 1/2008 |
| JP | S62-278248 A | 12/1987 |
| JP | S63-317651 A | 12/1988 |
| JP | H04-173939 A | 6/1992 |
| JP | H06-116686 A | 4/1994 |
| JP | 2001-164341 A | 6/2001 |
| JP | 2003-328088 A | 11/2003 |
| JP | 2004-018916 A | 1/2004 |
| JP | 2004-307918 A | 11/2004 |
| KR | 10-2005-0007572 A | 1/2005 |
| RU | 2 341 581 C2 | 12/2008 |
| WO | 2009/124530 A1 | 10/2009 |

OTHER PUBLICATIONS

N. Nabiran et al., "Influence of Intermetallic Precipitates and Heat Treatment on the Mechanical Properties of High-Temperature Corrosion Resistant Ferritic Steels." Procedia Engineering 10, pp. 1651-1656. (Year: 2011).*

Teruhisa Horita et al., "Effects of Si and Al concentrations in Fe—Cr alloy on the formation of oxide scales in H2—H2O." International Journal of Hydrogen Energy 33, pp. 6308-6315. (Year: 2008).*

Minfang Han et al., "Properties of Fe—Cr based alloys as interconnects in a solid oxide fuel cell." Journal of Power Sources 164, pp. 278-283. (Year: 2007).*

Yeong-Shyung Chou et al., "Effect of aluminizing of Cr-containing ferritic alloys on the seal strength of a novel high-temperature solid oxide fuel cell sealing glass." Journal of Power Sources 185, pp. 1001-1008. (Year: 2008).*

L. Niewolak et al., "Temperature dependence of phase composition in W and Si-alloyed high chromium ferritic steels for SOFC interconnect applications." Journal of Alloys and Compounds 717, pp. 240-253. (Year: 2017).*

Bin Hua et al., "Development of a Fe—Cr alloy for interconnect application in intermediate temperature of solid oxide fuel cells." Journal of Power Sources 195, pp. 2782-2788. (Year: 2010).*

International Search Report of PCT/DE2012/000609, dated Oct. 4, 2012.

W.J. Quadakkers, et al, Metallic interconnectors for solid oxide fuel cells—a review, Materials at High Temperatures 20(2) (2003), pp. 115-127.

F.H. Stott, et al, The development of silicon-containing oxides during the oxidation of iron-chromium-base alloys, Werkstoffe und Korrosion 38, (1987), pp. 521-531.

Brumm MW, Grabke HJ, The oxidation behaviour of NiAl—I. phase transformations in the alumina scale during oxidation of NiAl and NiAl—Cr alloys, Corrosion Science 33 Issue: 11 (1992), pp. 1677-1690.

Pragnell W.M., et al, Aluminium depletion in FeCrAlY Steel During Transitional Alumina Formation, Microscopy of Oxidation, Materials at High Temperatures 22 (2005), pp. 561-566.

Bürgel, Handbuch Hochtemperatur-Werkstofftechnik, 3. Auflage, Vieweg Verlag, Wiesbaden, (2006), pp. 348-350.

J. Froitzheim et al, Development of high strength ferritic steel for interconnect application in SOFCs, Journal of Sources 178 (2008) pp. 163-173 Power.

K. Yamamoto et al, Design of Laves phase strengthened ferritic heat resisting steels in the Fe—Cr—Nb(-Ni) system, Materials Science & Engineering a 329-331, Structural materials (2002), pp. 249-254.

N. Fujita et al, Effect of Nb on high-temperature properties for ferritic stainless steel, Scripta Materialia, Vo. 35, No. 6 (1996), pp. 705-710.

Y. Hosoi et al, Effect of Si and Mn on the precipitation behavior of Laves phase and toughness of 9C—2Mo steel, Transactions of the Iron and Steel Institute of Japan 26 (1986).

J. Klöwer, Factors affecting the oxidation behaviour of thin Fe—Cr13 Al foils Part II: The effect of alloying elements: Overdoping, Materials and Corrosion 51 (2000).

VDM Aluchrom 4 18 YHF, Material Data Sheet No. 4052, Sep. 2010 Edition (6 pages).

VDM Crofer 22 H, Material Data Sheet No. 4050, Jun. 2010 Edition (11 pages).

* cited by examiner

HEAT-RESISTANT IRON-CHROMIUM-ALUMINUM ALLOY WITH LOW CHROMIUM VAPORIZATION RATE AND ELEVATED THERMAL STABILITY

CROSS REFERENCE TO RELATED APPLICATIONS

This application is the National Stage of PCT/DE2012/000609 filed on Jun. 6, 2012, which claims priority under 35 U.S.C. § 119 of German Application No. 10 2011 111 703.6 filed on Jun. 21, 2011 and German Application No. 10 2012 004 488.7 filed on Mar. 6, 2012, the disclosures of which are incorporated by reference. The international application under PCT article 21(2) was not published in English.

BACKROUND OF INVENTION

1. Field of the Invention

The invention relates to an iron-chromium-aluminum alloy produced by smelting metallurgy and having outstanding corrosion resistance, low chromium vaporization rate and high hot strength.

2. Description of the Related Art

US 2005/0211348 A1 discloses a heat-resisting ferritic stainless steel and a process for manufacturing the steel. This steel has the following chemical compositions (in mass %): C≤0.02%, Si≤2%, Mn≤2%, Cr 12-40%, Mo 1-5%, W>2-<5%; Nb 5×(C+N) –1.0%; N≤0.02%, Fe the rest. The total content of Mo+W therein is supposed to be ≥4.3%.

DE 10025108 A1 teaches a high-temperature material comprising a chromium-oxide-forming iron alloy with up to 2 mass % of at least one oxygen-affine element from the group of Y, Ce, Zr, Hf and Al, up to 2 mass % of an element M from the group of Mn, Ni and Co, which together with chromium oxide forms a spinel phase of the $MCr_2O_4$ type at high temperatures, up to 2 mass % of a further element from the group of Ti, Hf, Sr, Ca and Zr, which increases the electrical conductivity of Cr-base oxides. The chromium content is supposed to lie in a concentration range between 12 and 28%. Areas of application for this high-temperature material are bipolar plates in a solid oxide fuel cell (high-temperature fuel cell or else SOFC).

EP 1298228 A1 relates to a steel for a solid oxide fuel cell that has the following composition: not more than 0.2% C, not more than 1% Si, not more than 1% Mn, not more than 2% Ni, 15-30% Cr, not more than 1% Al, not more than 0.5% Y, not more than 0.2% rare earths and not more than 1% Zr, the rest iron and manufacturing-related impurities.

Features common to both of these alloys are low hot strength and inadequate creep strength at temperatures above 700° C. In the particular range between 700° C. and approximately 900° C., however, these alloys have outstanding oxidation and corrosion resistance and also, by virtue of the chromium-manganese spinel structure due to the manganese content, low chromium vaporization.

From DF 102006007598 A1 there has become known a creep-resistant ferritic steel, containing precipitates of an intermetallic phase of the type $Fe_2(M, Si)$ or $Fe_7(M, Si)_6$ with at least one metallic alloying element M, which may represent the elements niobium, molybdenum, tungsten or tantalum. The steel is intended preferably for use for a bipolar plate in a solid oxide fuel cell stack.

From EP 1536031 A1 there has become known a metallic material for solid oxide fuel cells, containing ≤0.2% C, 0.02 to 1% Si, ≤2% Mn, 10 to 40% Cr, 0.03 to 5% Mo, 0.1 to 3% Nb, at least one of the elements from the group of Sc, Y, La, Ce, Pr, Nd, Pm, Sn, Zr and Hf≤1%, the rest iron and unavoidable impurities, wherein the composition must satisfy the following equation: 0.1≤Mo/Nb≤30.

EP 1882756 A1 describes a ferritic chromium steel, which may be used especially in solid oxide fuel cells. The chromium steel has the following composition: C max. 0.1%, Si 0.1-1%, Mn max. 0.6%, Cr 15-25%, Ni max. 2%, Mo 0.5-2%, Nb 0.2-1.5%, Ti max. 0.5%, Zr max. 0.5%, rare earths max. 0.3%, Al max. 0.1%, N max. 0.07%, the rest Fe and smelting-related impurities, wherein the content of Zr+Ti is at least 0.2%.

By comparison with DE 10025108 A1 and with EP 1298228 A2, the alloys known heretofore have improved hot strength and elevated creep strength at temperatures above 700° C., specifically due to formation of precipitates that prevent dislocation movements and therefore plastic deformation of the material. In the case of DE 102006007598 A1, for example, these precipitates consist of a Laves phase, an intermetallic compound with the composition $Fe_2(M, Si)$ or $Fe_7(M, Si)_6$, wherein M may be niobium, molybdenum, tungsten or tantalum. They are supposed to attain a volume fraction of 1 to 8%, preferably 2.5 to 5%. Of course, they may also be other precipitates, such as Fe-containing and/or Cr-containing and/or Si-containing particles, as described in EP 1536031 A1, for example, or carbides of Nb, W, Mo. All of these particles have the property in common that they impede deformation of the material.

From the prior art described hereinabove, it is known that minor additions of Y, Zr, Ti, Hf, Ce, La and similar reactive elements may have a strong positive influence on the oxidation resistance of Fe—Cr alloys.

The alloys cited in DE 102006007598 A1, EP 1536031 A1 and EP 1882756 A1 are optimized for application as interconnector plates for solid oxide fuel cells. By virtue of the use of a ferritic alloy with 10 to 40% chromium, they have an expansion coefficient adapted as well as possible to the ceramic components anode and electrolyte.

Further requirements for the interconnector steel of a solid oxide fuel cell are not only the creep strength already mentioned hereinabove but also very good corrosion resistance, good conductivity of the oxide layer and low chromium vaporization.

The requirements for the reformer and the heat exchanger for the solid oxide fuel cell are—similarly to the requirements for the interconnector plates—the best possible creep strength, very good corrosion resistance and low chromium vaporization. The oxide for these components does not have to be conductive, since no electrical continuity is necessary.

The corrosion resistance in DE 102006007598 A1, for example, is achieved by formation of a chromium oxide covering layer. Because a spinel containing Mn, Ni, Co or Cu is additionally formed on the chromium oxide covering layer, fewer volatile chromium oxides or chromium oxide hydroxides capable of poisoning the cathode are formed. Also, because Si is stably bound in the $Fe_2(M, Si)$ or $Fe_7(M, Si)_6$ Laves phase, a non-conductive underlayer of silicon oxide is not even formed under the chromium oxide covering layer. The corrosion resistance is further improved by the fact that the Al content is kept low and so increased corrosion due to internal oxidation of aluminum is prevented. A small addition of Ti ensures further strengthening of the surface and therefore prevents bulging of the oxide layer and inclusion, in the oxide layer, of metallic zones, which would increase the oxidation. Moreover, the addition of oxygen-affine elements such as La, Ce, Y, Zr or the like further increases the corrosion resistance.

It is common to the prior art described hereinabove that these steels form, under a chromium-manganese oxide layer, an oxide layer, consisting of chromium oxide, which is conductive on the whole. Such a conductive oxide layer must be used when the steel must be installed as an interconnector plate in a solid oxide fuel cell. When used as a reformer or heat exchanger for the solid oxide fuel cell, very low chromium vaporization is also required, because the gases passed through this component are also passed into the solid oxide fuel cell among other areas and the chromium vaporized by them may then poison the solid oxide fuel cell. However, the oxide layer must be nonconductive, so that silicon oxide or aluminum oxide layers, for example, could also be used here (on this subject see, for example, Quadakkers W. J., Piron-Abellan J., Shemet V, Singheiser L. Metallic Interconnects for Solid Oxide Fuel Cells—a Review, Materials at High Temperatures 20(2) (2003) 115-127).

The addition of silicon to iron-chromium alloys promotes the formation of the embrittling sigma phase, which is not necessary for a structural part. In alloys that form silicon oxide layers, these tend to spoiling, which is not advantageous (in this regard see F. H. Stott, G. J. Gabriel, F. I. Wei, G. C. Wood, The development of silicon-containing oxides during the oxidation of iron-chromium-base alloy, Werkstoffe and Korrosion 38 (1987), pages 521-531).

The formation of an aluminum oxide layer may be achieved by addition of a sufficient proportion of aluminum in an iron-chromium alloy.

Ferritic iron-chromium alloys, which form an aluminum oxide layer during use at high temperatures, are known, for example, from the following publications.

DE 10310865 B3 describes the use of an iron-chromium-aluminum alloy with good oxidation resistance, with (in mass %) 2.5 to 5.0% aluminum, 10 to 25% chromium and 0.05-0.8% silicon as well as additions of >0.01 to 0.1% yttrium and/or >0.01 to 0.1% hafnium and/or >0.01 to 0.2% zirconium and/or >0.01 to 0.2% cerium mixed metal (Ce, La, Nd) as well as manufacturing-related impurities for components in diesel vehicles and two-stroke engines, especially in diesel and two-stroke motors.

DE 10157749 A1 describes an iron-chromium-aluminum alloy with long useful life, with (in mass %)>2 to 3.6% aluminum and >10 to 20% chromium as well as additions of 0.1 to 1% Si, max. 0.5% Mn, 0.01 to 0.2% yttrium and/or 0.1 to 0.2% Hf and/or 0.1 to 0.3% Zr, max. 0.01% Mg, max. 0.01% Ca, max. 0.08% carbon, max. 0.04% nitrogen, max. 0.04% phosphorus, max. 0.01% sulfur, max. 0.05% copper and max. 0.1% molybdenum and/or tungsten respectively as well as the usual manufacturing-related impurities and the rest iron. This alloy is intended for use as a heat conductor in heating elements of household appliances and in furnace construction as well as for use as a support foil in catalysts and also as braking and starting resistors.

JP 6116686 A describes an Fe—Cr—Al alloy with excellent oxidation resistance, which contains (in mass %) max. 0.05% carbon, max. 0.02% nitrogen, max. 1.0% silicon, max. 1.5% manganese, max. 0.01% sulfur, in total at most 0.05% titanium and niobium, at most 0.01% cerium, 10 to 28% chromium, 1 to 6% aluminum, 0.0003 to 0.010% Ca and also 0.01 to 0.20% lanthanum, 0.01 to 1% zirconium, wherein the formula 0.1<Zr/La<20 is satisfied, with the rest iron and unavoidable impurities. The alloy is used as a foil.

JP 62278248 A describes an iron-chromium-aluminum alloy that unites good thermal deformability with excellent adhesion of the oxide layer. It consists of (in mass %) 10-26% chromium, 1 to 6% aluminum, 0.006 to 0.08% Y, 0.0005 to 0.03% magnesium, iron as the rest and the unavoidable impurities. If necessary, in total ≤0.80% of one or more of the elements from 0.03 to 0.40% Ti, 0.10 to 0.80% zirconium and 0.10 to 0.80% Nb, if necessary, in total 0.006 to 0.08% of the elements Hf and/or rare earths (except Y) may be present. By addition of yttrium and magnesium, the thermal deformability and the adhesion of the oxide layer are improved. This alloy is used as heat-conductor wire.

U.S. Pat. No. 5,228,932 A describes an Fe—Cr—Al alloy with good oxidation resistance and high resistance to high-temperature embrittlement. It contains (in mass %) 10 to 28% chromium, 1 to 10% aluminum, 0.0003 to 0.010% boron, 0.01 to 0.20% lanthanum, 0.01 to 1% zirconium, wherein the formula 0.1<Zr/La<20 is satisfied. Furthermore, it contains ≤0.05% carbon, ≤0.02% nitrogen, ≤0.50% silicon, ≤1.0% manganese, ≤0.05% titanium, the rest iron as well as the unavoidable impurities. Additions of niobium, vanadium and tantalum in a proportion of at most 1% are optional. The steel is suitable as a support material for catalysts in exhaust-gas systems.

A common feature of the iron-chromium-aluminum alloys described in the publications according to DE 10310865 B3, DE 10157749 A1, JP 6116686 A, JP 62278248 A and EP 0516097 A1 is that they have very low hot strength.

EP 0290719 A1 describes a ferritic heat-resisting steel that consists of (in mass %) max. 0.10% carbon, max. 0.80% silicon, 0.10 to 0.50% manganese, max. 0.035% phosphorus, max. 0.020% sulfur, 12 to 30% chromium, 0.10 to 1.0% molybdenum, max. 1% nickel, 3.5 to 8% aluminum, 0.01 to 1% Zr, 0.003 to 0.8% rare earth metals, 0.003 to 0.30% titanium, 0.003 to 0.050% nitrogen, the rest Fe and unavoidable impurities. By combined addition of oxygen-affine elements, the steel is improved in its behavior at high application temperatures. Besides stabilization of the electrical resistance of heating elements made from this steel by means of additions of zirconium, titanium and rare earth metals, the creep elongation of the steel under its own load at temperatures above 900° C. is also substantially reduced, and therefore the thermal loadability is increased. The oxide layer formed enhances the protective function for preservation of the metallic cross section during continuous and/or cyclic heat treatment. The steel is intended mainly for use in heating wires and heating elements of all kinds as well as for structural parts for guiding and cleaning exhaust gases downstream from combustion processes (exhaust-gas catalysts).

EP 0516267 A1 describes a ferritic heat-resisting steel consisting of (in mass %) less than 0.03% carbon, less than 1% silicon, less than 1% manganese, less than 0.04% phosphorus, less than 0.03% sulfur, 15 to 25% chromium, less than 0.03% nitrogen, 3 to 6% aluminum, 0.1 to 4% molybdenum, 0.01 to 0.15% yttrium and or rare earth metals, the rest iron. Optionally, 0.05 to 1% of one or more of the elements niobium, vanadium and titanium may be added. This steel has excellent oxidation resistance at high temperatures. It is suitable for use as support material for catalysts in exhaust-gas systems and also for heating elements.

A common feature of the iron-chromium-aluminum alloys described in EP 0290719 A1 and EP 0516267 A1 is that they permit additions of up to 4% molybdenum and therefore, via the mechanism of solid-solution hardening, the creation of a certain hot strength is possible.

WO 2009/124530 A1 describes an iron-chromium-aluminum alloy with long useful life and little change of the heat resistance with (in mass %) 4.5 to 6.5% aluminum, 16 to 24% chromium, 1.0 to 4.0% tungsten, 0.05 to 0.7% silicon, 0.001 to 0.5% manganese, 0.02 to 0.1% yttrium, 0.02 to 0.1% zirconium, 0.02 to 0.1% hafnium, 0.003 to 0.030% carbon, 0.002 to 0.03% nitrogen, max. 0.01% sulfur, max. 0.5% copper, the rest iron as well as the usual smelting-related impurities.

In the iron-chromium-aluminum-tungsten alloy described in WO 2009/124530 A1, a certain hot strength is created via the mechanism of solid-solution hardening after addition of tungsten. This alloy was optimized for heat-conductor applications. Therefore the lower limit of the aluminum content is already very high at 4.5%, meaning that processability is somewhat moderate.

DE 19928842 A1 describes a ferritic oxidation-resistant iron-chromium-aluminum-yttrium-hafnium alloy for foils and wires with improved useful life and reduced oxidation rate at high temperatures as well as high specific electrical resistance. It contains (in mass %) 16 to 22% chromium, 6 to 10% aluminum, 0.02 to 1.0% silicon, max. 0.5% manganese, 0.02 to 0.1% hafnium, 0.02 to 0.1% yttrium, max. 0.01% magnesium, max. 0.02% titanium, max. 0.09% zirconium, max. 0.02% rare earth metals, max. 0.1% strontium, max. 0.1% calcium, max. 0.5% copper, max. 0.1% vanadium, max. 0.1% tantalum, max. 0.1% niobium, max. 0.03% carbon, max. 0.01% nitrogen, max. 0.01% boron, the rest iron and the usual smelting-related impurities.

In the iron-chromium-aluminum alloy described in DE 19928842 A1, a certain hot strength can be created by additions of up to 2% molybdenum and tungsten. This alloy was optimized as a support foil for exhaust-gas catalysts with very thin foil thickness. Therefore the lower limit of the aluminum content is already very high at 6%, and so processing to semifinished product is difficult.

The aluminum-oxide-forming iron-chromium-aluminum alloys described here have too low hot strength, since an increase—if any at all—of the hot strength is provided only via solid-solution strengthening. Beyond this, some are additionally difficult to form or process.

Because of the nature of the market, for example for the already mentioned heat exchangers for solid oxide fuel cells, products are subject to requirements such as elevated hot strength or creep strength with simultaneously good high-temperature ductility to avoid brittle failure, a very low chromium vaporization rate, much smaller than that of chromium-manganese oxides, as well as very good oxidation or corrosion resistance, all while still having acceptable deformability and processability at room temperature. This means that service temperatures of the alloy should be possible up to 900° C. without further protective layers.

These requirements of chromium vaporization can be met only with alloys that form a stable, dense α-aluminum oxide layer, which contains a small proportion of Cr impurities and thus exhibits practically zero chromium vaporization. α-Aluminum oxide layers impart much better oxidation and corrosion resistance than chromium oxide layers. However, care must also be taken to prevent excessive formation of non-dense, metastable aluminum oxides.

SUMMARY OF THE INVENTION

It is therefore the object of the invention to design a ferritic α-aluminum oxide builder, wherein elevated hot strength (measured as the high-temperature yield strength and tensile strength in the high-temperature tension test) or creep strength accompanied by simultaneously good high-temperature ductility corresponding to an elongation of at least 30% at application temperature is combined with the very good oxidation or corrosion resistance of an α-aluminum oxide layer, and does so while still having acceptable deformability, measured as the plastic deformation in the tension test with an elongation of >18% at room temperature.

This object is achieved by an iron-chromium-aluminum alloy with improved hot strength, low chromium vaporization rate and good processability, with (in mass %) 2.0 to 4.5% Al, 12 to 25% Cr, 1.0 to 4% W, 0.25 to 2.0% Nb, 0.05 to 1.2% Si, 0.001 to 0.70% Mn, 0.001 to 0.030% C, 0.0001 to 0.05% Mg, 0.0001 to 0.03% Ca, 0.001 to 0.030% P, max. 0.03% N, max. 0.01% S, the rest iron and the usual smelting-related impurities.

This object is achieved by an iron-chromium-aluminum alloy with improved hot strength, low chromium vaporization rate and good processability, with (in mass %) 2.0 to 4.5% Al, 12 to 25% Cr, 1.0 to 4% W, 0.25 to 2.0% Nb, 0.05 to 1.2% Si, 0.001 to 0.70% Mn, 0.001 to 0.030% C, 0.0001 to 0.05% Mg, 0.0001 to 0.03% Ca, 0.001 to 0.030% P, max. 0.03% N, max. 0.01% S, additionally containing 0.01 to 0.10%, especially 0.03-0.09% yttrium, 0.01 to 0.10%, especially 0.02-0.08% hafnium; 0.01 to 0.10%, especially 0.02-0.08% zirconium, wherein W can be replaced by 1 to 4% Mo, wherein Y can be replaced completely or partly by 0.01 to 0.10% of at least one of the elements Sc and/or La and/or cerium and wherein Hf or Zr can be replaced completely or partly by 0.01 to 0.1% of the element Ti, if necessary further containing at most 1.0% nickel, at most 1.0% Co, at most 0.5% copper, at most 0.1% vanadium, 0.001 to 0.010% oxygen and/or 0.0001-0.008% boron, the rest iron and the usual smelting-related impurities, such as especially Pb with at most 0.002%, Zn with at most 0.002% and Sn with at most 0.002%, wherein the alloy satisfies the following formulas:

36%<Cr+3*(Al+Si)+4.6*Mo+5.2*W+10*Nb, where Cr, Al, Si, Mo, W and Nb represent the alloying content of these elements in mass % (Formula 1a), 0.2*Nb≤Si≤0.7*Nb, where Si and Nb represent the alloying content of these elements in mass % (Formula 2), 19%<Cr+4*Nb+21.6*min(Si; 0.5*Nb), where Cr, Si and Nb represent the alloying content of these elements in mass % and min(Si; 0.5*Nb) is the smaller of the values of Si and 0.5*Nb (Formula 3a).

Advantageous improvements of the subject matter of the invention may be inferred from the associated dependent claims.

Likewise, a further advantage is achieved when the following formula is also satisfied:

36%<Cr+3*(Al+Si)+4.6*Mo+5.2*W+10*Nb        (Formula 1a), where Cr, Al, Si, Mo, W and Nb represent the alloying content of these elements in mass %.

Advantageously, Formula Ia may be restricted as follows:

40%<Cr+3*(Al+Si)+4.6*Mo+5.2*W+10*Nb        (Formula 1b),

It is particularly advantageous when the alloy also satisfies the following formula:

0.2*Nb≤Si≤0.7*Nb        (Formula 2), where Si and Nb represent the alloying content of these elements in mass %.

A further advantage is achieved when the following formula is also satisfied:

19%<Cr+4*Nb+21.6*min(Si;0.5*Nb)        (Formula 3a), where Cr, Si and Nb represent the alloying content of these elements in mass % and min(Si; 0.5*Nb) is the smaller of the values of Si and 0.5*Nb.

It may also be advantageous if Formula 3a is modified as follows:

$$21\% < Cr + 4*Nb + 21.6*\min(Si; 0.5*Nb) \quad \text{(Formula 3b)},$$

The variation range for the element chromium lies between 12 and 25%, wherein chromium contents may be given as follows depending on the service case and adjusted in the alloy as a function of the service case:
14 to 23%
16 to 23%.

The aluminum content lies between 2.0 and 4.5%, wherein here also aluminum contents may be given as follows depending on the service area of the alloy:
2.5 to 4.5%
3.0 to 4.5%
3.0 to 4.0%.

The tungsten content in the alloy lies between 1.0 and 4.0%. Preferably it may also be adjusted, with a variation range of
1.5 to 3.0%.

Tungsten may also be replaced completely or partly by Mo and/or Ta.

The alloy may contain 0.25 to 2.0% niobium. Preferably niobium may be adjusted in the alloy within the variation range as follows:
0.30% to 1.2%.

The silicon content lies between 0.05 and 1.2%. Preferably Si may be adjusted in the alloy within the variation range as follows:
0.05-1.0%
0.09-1.0%.

The same is true for the element manganese, which may be contained in the alloy in proportions of 0.001 to 0.70%. Alternatively, the following variation range is also conceivable:
0.05-0.40%.

The alloy contains 0.001 to 0.030% carbon. Preferably C may be adjusted in the alloy within the variation range as follows:
0.002-0.020%
0.002-0.015%.

Magnesium is also present in contents of 0.0001 to 0.05%. Preferably the possibility exists of adjusting this element in the alloy as follows:
0.0001-0.03%
0.0001-0.02%.

Furthermore, the alloy contains calcium in contents of between 0.0001 and 0.03%. Preferably the possibility exists of adjusting this element in the alloy as follows:
0.0001-0.02%
0.0001-0.01%.

Furthermore, the alloy contains phosphorus in contents of between 0.001 and 0.030%. Preferably it may contain 0.010 to 0.025% P.

The element nitrogen is contained in the alloy in proportions of max. 0.03%. Preferred contents may be present as follows:
max. 0.020%
max. 0.012%.

The element sulfur is contained in the alloy in proportions of max. 0.01%. Preferred contents may be present as follows:
max. 0.005%.

The material properties may be improved if necessary by additions of the element yttrium in contents of 0.01 to 0.10%. Preferably yttrium may be adjusted in the alloy within the variation range as follows:
0.03-0.09%.

Optionally, hafnium may also be used in contents of 0.01 to 0.10%. Preferably it may be adjusted in the alloy within the variation range as follows:
0.02-0.08%.

Optionally, zirconium may also be provided in contents of 0.01 to 0.10%. Preferably it may be adjusted in the alloy within the variation range as follows:
0.02-0.08%.

Optionally, yttrium may be replaced completely or partly by 0.01 to 0.10% lanthanum and/or 0.01 to 0.10% cerium and/or 0.01 to 0.10% scandium.

Optionally, hafnium or zirconium may be replaced completely or partly by the element titanium.

Furthermore, the alloy may contain max. 1.0% nickel, which beyond this may be further restricted as follows:
max. 0.5%.

Furthermore, the alloy may contain max. 1.0% cobalt, which beyond this may be further restricted as follows:
max. 0.5%.

The element copper may be contained in the alloy in proportions of max. 0.50%.

Furthermore, max. 0.1% vanadium may be contained in the alloy.

The elements boron and oxygen may be optionally contained in the alloy in the following proportions:
boron 0.0001-0.008%
oxygen 0.001-0.010%.

Finally, the elements lead, zinc and tin may also be present as impurities in the following contents:
Pb max. 0.002%
Zn max. 0.002%
Sn max. 0.002%.

The inventive alloy may be readily manufactured and used in the product forms strip, sheet, bar and wire.

As strip, the inventive alloy is preferably used in the thickness range of 0.02 mm to 3 mm.

As wire, the inventive alloy is preferably used in the diameter range of 0.01 to 12 mm.

The inventive alloy may be used, for example, in a solid oxide fuel cell, especially as the nonconductive part of interconnector plates and as a component in the additional aggregates of a solid oxide fuel cell, such as in a heat exchanger. Furthermore, it may be used as a component in hot gases, even with fractions containing a low oxygen partial pressure and/or carbon, nitrogen and/or water vapor. Use as a support foil and/or wire mesh in metallic exhaust-gas catalysts or as heating elements is also possible.

The range of use of the inventive alloy extends up to temperatures of 1100° C. Use of the alloy up to 1000° C. is particularly advantageous.

DETAILED DESCRIPTION OF PREFERRED EMBODIMENT

EXAMPLES

Figure 1:
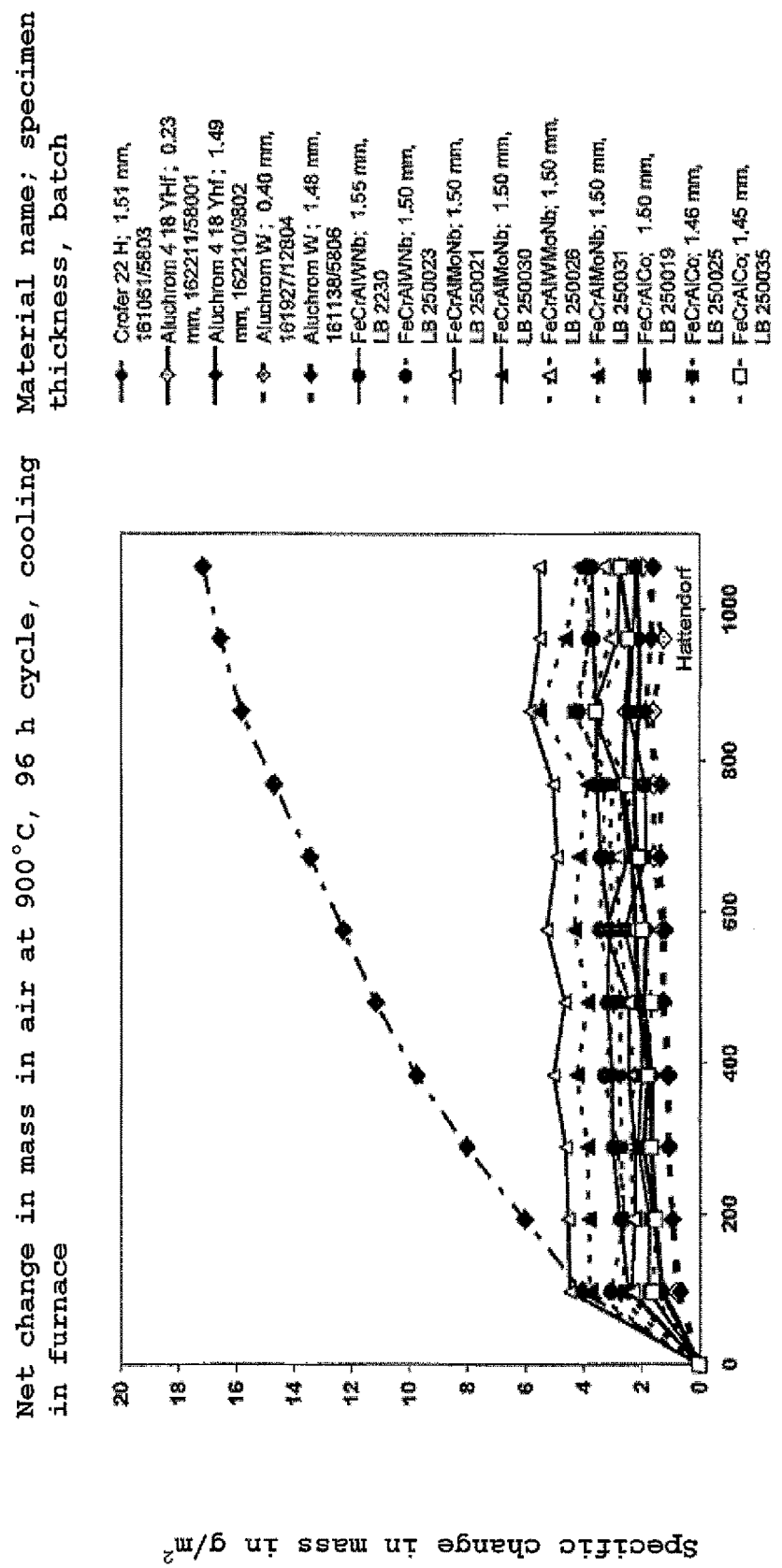
FIG. 1 is a graph showing the specific change in mass of specimens (net change in mass) as a function of test time.

As standard alloys according to the prior art, Crofer 22 H, Aluchrom W and Aluchrom 418 YHf were available. These alloys were smelted in air under commercial conditions in the 30 metric ton arc furnace, subjected to treatment in a VOD (vacuum oxidation decarburation) system and cast in ingots. These were hot-rolled to sheet or hot strip. The sheet or hot strip was solution-annealed. The sheet or hot strip was ground, cold-rolled to final thickness with intermediate annealing treatments then solution-annealed in a continuous bright-annealing furnace.

The test heats were smelted in a vacuum induction furnace. The cast ingots were hot-rolled to 12 mm thickness and 4 mm. The hot-rolled sheets were solution-annealed. The 4 mm sheet was ground, cold-rolled to final thickness (approx. 1.5 mm), if necessary with intermediate annealing treatments, then solution-annealed in a continuous bright-annealing furnace.

Tables 1 and 2 present the alloys smelted under commercial conditions according to the prior art (T) and the test batches (LB before the batch number). The inventive alloys are indicated by E and the non-inventive test batches by V.

Crofer 22 H is an alloy with approx. 22% Cr, approx. 0.45% Mn, approx. 0.25% Si, approx. 0.51% Nb, approx. 2% W, approx. 0.06% Ti, the rest Fe. It forms the two-level oxide layer already described in the foregoing from a chromium-manganese spinel above a chromium oxide layer. Moreover, by virtue of the tungsten content (solid-solution hardening) and the formation of the Laves phases, which are intermetallic phases of the type $Fe_2(M, Si)$ and $Fe_7(M, Si)_6$ containing Nb and tungsten, it has very good hot strength. The Laves phase is additionally stabilized by the Si content.

Aluchrom W and Aluchrom 418 YHf are two commercial iron-chromium-aluminum alloys with additions of oxygen-affine elements, such as Y, Zr and Hf, for improvement of the oxidation resistance. Aluchrom W consists of approx. 14.5% chromium, approx. 4.5% aluminum, approx. 0.2% Zr, the rest iron. Aluchrom 418 YHf consists of approx. 18% chromium and approx. 4% aluminum, 0.2% Zr, the rest iron.

The test heats have approx. 19.5% chromium and approx. 3.5% aluminum and different contents of silicon (0.1 to 0.31%), tungsten (0.01 to 2.04%), molybdenum (0.001 to 2.0%) and cobalt (0.01 to 3.04%). Their mechanical characteristics were investigated at room temperature to determine the processability and the influence of the various elements on the hot strength or creep strength, wherein additives were chosen both to increase the proportion of solid-solution strengthening and to bring about strengthening by precipitates of an intermetallic phase of the type $Fe_2(M, Si)$ and $Fe_7(M, Si)_6$. Then it was determined whether these additions substantially impair the ability of the iron-chromium-aluminum alloy to form $\alpha$-aluminum oxide.

Mechanical Characteristics at Room Temperature.

The deformability is determined in a tension test according to DIN 50125 at room temperature. In the process, the offset yield strength $R_{p0.2}$, the tensile strength $R_m$ and the elongation A after fracture are determined. The elongation A of the fractured sample is calculated from the increase in length compared with the original gauge length $L_0$:

$$A=(L_u-L_0)/L_0 100\%=\Delta L/L_0 100\%$$

where $L_u$=measured length after fracture.

Depending on gauge length, the elongation after fracture is characterized by indices:

gauge length $L_0=5 \cdot d_0$ or $L_0=5.65 \cdot \sqrt{S_0}$
gauge length $L_0=10 \cdot d_0$ or $L_0=11.3 \cdot \sqrt{S_0}$
or, for example, $A_{L=50}$, for the freely chosen gauge length L=50 mm.

($d_0$ initial diameter, $S_0$ initial cross section of a flat specimen)

The magnitude of the elongation A in the tension test at room temperature can be taken as a measure of the deformability.

The test results are listed in Table 3. They were obtained on flat tension specimens with thicknesses between 0.23 and 1.50 mm. All investigated alloys—the commercial alloys Aluchrom W, Aluchrom 418 YHf and Crofer 22 H—and the test alloys have an elongation $A_{50}$ greater than 18% and thus satisfy the processability requirement. The addition of Nb, W, Mo and Co and combinations of Mo and W with/without Si to an alloy with 19% Cr, 3.5% Al and the rest Fe does not impair the deformability and therefore the processability.

High-temperature Tension Tests at 900° C.

For the high-temperature tension tests, flat tension specimens were prepared from 1.5 mm thick sheets, and in one case also from 0.31 mm thick sheet. Those had an initial gauge length of 10 mm for the elongation measurement. The high-temperature tension tests were carried out at 900° C. Tests were performed with two deformation rates, one being $10^{-3}$ 1/s (range for tension tests) and the other $10^{-5}$ 1/s (for simulation of the creep strength). Prior to the start of a test, the specimens were at test temperature for 1.5 hours for temperature equilibration.

The test results are listed in Table 4. All investigated alloys—the commercial alloys Aluchrom W, Aluchrom 418 YHf and Crofer 22 H—and the test alloys had an elongation $A_{50}$ at 900° C. greater than 30% at deformation rates of both $10^{-3}$ 1/s and $10^{-5}$ 1/s, thus satisfying the requirement of good high-temperature ductility.

The addition of combinations of Nb, W, Mo and combinations of Mo and W to an alloy with approx. 19% Cr, approx. 3.5% Al and the rest Fe increases the tensile strength $R_m$ compared with Aluchrom W and Aluchrom 418 YHf at deformation rates of both $10^{-3}$ 1/s and $10^{-5}$ 1/s. At the deformation rate of $10^{-3}$ 1/s, the hot strength of the inventive alloy is even increased beyond the hot strength of Crofer 22 H. At a deformation rate of $10^{-5}$ 1/s, the inventive iron-chromium-aluminum alloy has strength similar to that of Crofer 22 H.

These good characteristics with respect to hot strength are preserved during variation of the several components of the alloy, provided the condition 36%<Cr+3*(Al+Si)+4.6*Mo+5.2*W+10*Nb (Formula Ia or F1 in Tables 1 to 4) is satisfied, wherein this formula takes into consideration especially the contributions of solid-solution hardening. This formula is satisfied by the inventive alloy.

Furthermore, the good characteristics of higher strength at 900° C. are preserved, especially at very low deformation rates such as $10^{-5}$ 1/s, during variation of the several components of the alloy, provided the condition 19%<Cr+4*Nb+21.6*min(Si; 0.5*Nb) (Formula 3a or F3 in Tables 1 to 4) is satisfied, wherein this formula takes into consideration especially the contributions of strengthening imparted by precipitates of an intermetallic phase of the type $Fe_2(M, Si)$ or $Fe_7(M, Si)_6$. This formula is satisfied by the inventive alloy.

The proportion of silicon, which is necessary to promote formation and stabilization of the Laves phase, can vary in a certain range as a function of the niobium content. This range is defined by 0.2*Nb>Si>0.7*Nb (Formula 2). The inventive alloy lies in this range.

Oxidation Tests in Air

For the oxidation test, specimens with dimensions of 25 mm×15 mm×material thickness were cut out of the strip. The edges were ground and the main faces were left as rolled. Strip thicknesses of 1.5 mm were investigated for all alloys. Of the alloys according to the prior art, strip thicknesses of 0.23 mm (Aluchrom 418 YHf) and 0.4 mm (Aluchrom W) were additionally investigated.

The oxidation test was carried out at 900° C. in air. The specimens were all cooled for 96 hours to room temperature, in order to permit measurement of the weight change. In total, 11 cycles were applied. The specimens were weighed before the test and placed in aluminum oxide crucibles of known initial weights, so that any spalled material could be collected. During each test interruption, the weight changes of the specimens relative to the weight in the initial condition and the weight change of the crucible and the spalled material relative to the initial weight before the test were determined. The weight changes are plotted in FIG. 1, relative to the starting area of the specimens (specific change in mass). At least three specimens of each material were subjected to the test and the mean value was calculated.

Spalled material was not observed in any specimen. FIG. 1 shows the specific change in mass of the specimens (net change in mass) as a function of test time. Crofer 22 H exhibits the typical curve shape for parabolic oxide growth. It has the highest specific change in mass. All tested iron-chromium-aluminum alloys (test batches and batches according to the prior art) have a much smaller specific change in mass. After a larger increase in mass during the first 96 hours, the change in mass reached at that time hardly changes further. This typically means that somewhat metastable aluminum oxide formed at the beginning of oxidation, resulting in a larger weight increase in the first 96 hours, after which the transformation to the complete formation of α-aluminum oxide took place, resulting in a non-measurable weight increase in the remaining test period of 960 hours (see, for example, The oxidation behavior of NIAL. 1. Phase transformations in the alumina scale during oxidation of NIAL and NIAL-CR alloys; Brumm M W, Grabke H J ; Corrosion Science 33 Issue: 11 (1992), page 1677 et seq. and Pragnell W. M., Evans H. E., Naumenko D., Quadakkers W. J. Aluminum Depletion in FeCrAlY Steel During Transitional Alumina Formation, Microscopy of Oxidation, Materials at High Temperatures 22 (2005), 561-566). The alloys according to the prior art exhibit the smallest change in mass due to metastable aluminum oxides, while the additions such as Nb, W, Mo slightly enhance the tendency toward metastable oxide formation in the initial phase. For all alloys, the transformation to α-aluminum oxide formation takes place reliably.

High-temperature Compression Tests at 900° C.

The high-temperature offset compressive yield strength was investigated by means of a DIL 805 quenching and deformation dilatometer of the Bähr-Thermoanalyse Co. This permits precise temperature programming under vacuum with simultaneous deformation. The specimens used were cylindrical and had a length of 10 mm and a diameter of 5 mm.

To investigate the precipitation behavior on the high-temperature offset compressive yield strength as a function of time, the dilatometer specimens were solution-annealed in a muffle furnace and aged for 1 h, 24 h, 192 h, 720 h and 1440 h at 900° C. Deformation at 900° C. was applied by uniaxial pressing without shape constraint for a deformation travel of 5 mm with a constant strain rate of $10^{-3}$ 1/s. This was followed by gas quenching with nitrogen to room temperature.

Figure 2:
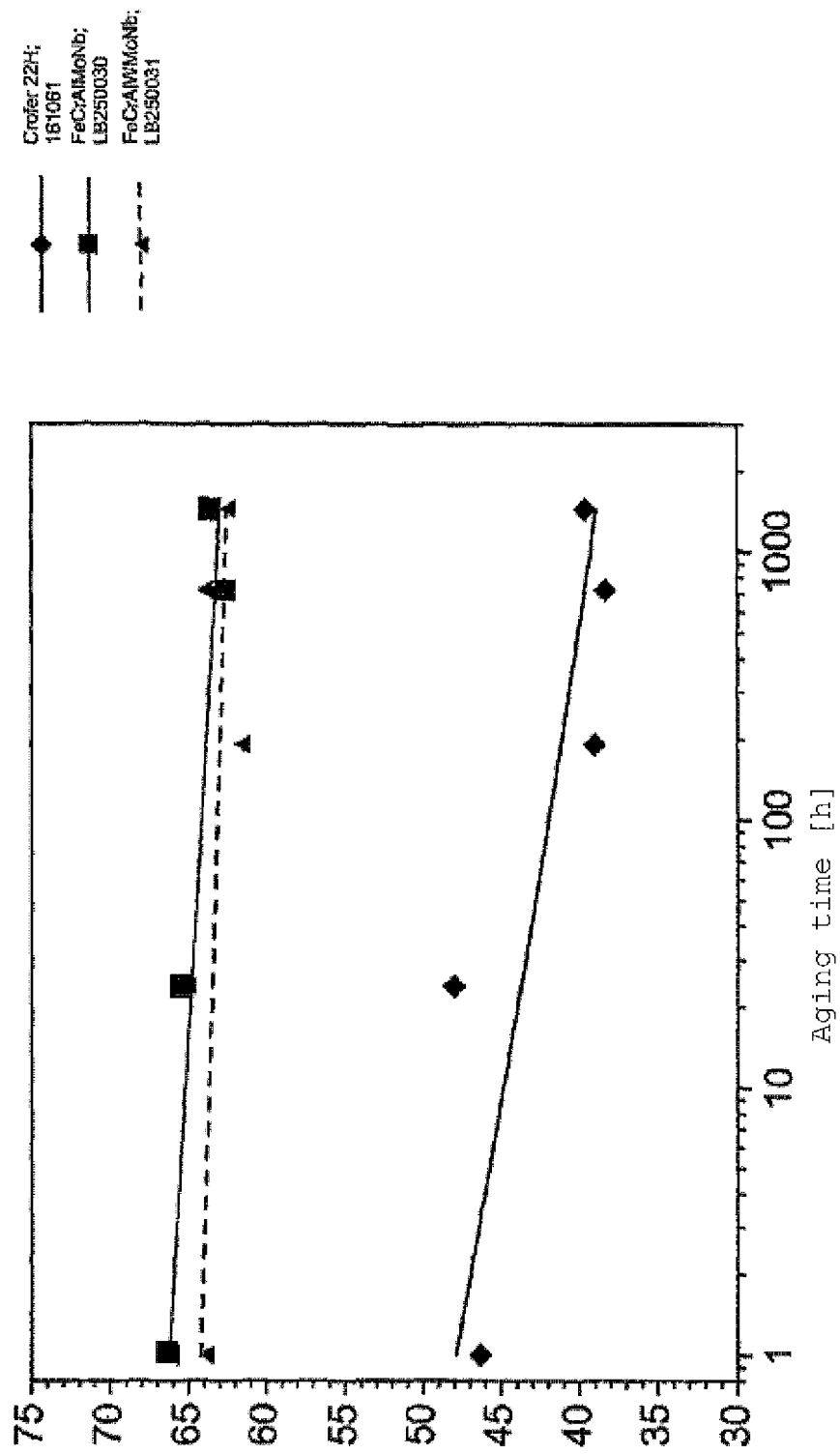
FIG. 2 is a graph showing offset compressive yield strength (MPa) as a funcation of aging time (h)

The test results for 1 h of aging are listed in Table 5 and plotted graphically in FIG. 2.

The inventive laboratory batches (LB 250023, LB 250030 and LB 250031) exhibit higher hot strength at 900° C. than does the Crofer 22 H alloy according to the prior art and the test heat LB 250031. The elevated hot strength of the inventive alloys (LB 250030 and LB 250031) is preserved even after longer aging times (up to 1440 h). The slight loss of hot strength over the aging time is associated with the stability of the Laves phase precipitate. Because of the combination of Nb and Si, the precipitate of the Laves phase is very stable both in the inventive laboratory heats and in Crofer 22 H. These act to inhibit the grain-coarsening process and contribute to stabilization of the hot strength over time. LB 250030 and LB 250031 have a higher Nb content than Crofer 22 H. This means that the proportion of Laves phase in these laboratory heats is higher than in Crofer 22 H and that they are therefore more stable over longer aging periods (FIG. 2). In addition, the content of W (LB 250023) or of Mo (LB 250030) or of a combination of W and Mo (LB 250031) and the aluminum content of the inventive batches results in solid-solution hardening. Especially because of the Al content, the offset compressive yield strength in LB 250023, LB 250030 and LB 250031 is much higher than in Crofer 22 H without aluminum. The content of Co in LB 250035 does not bring about any marked additional solid-solution hardening, which is why LB 250035 has a much lower offset compressive yield strength than do LB 250030 and LB 250031.

Sigma Phase Formation

Figure 3:
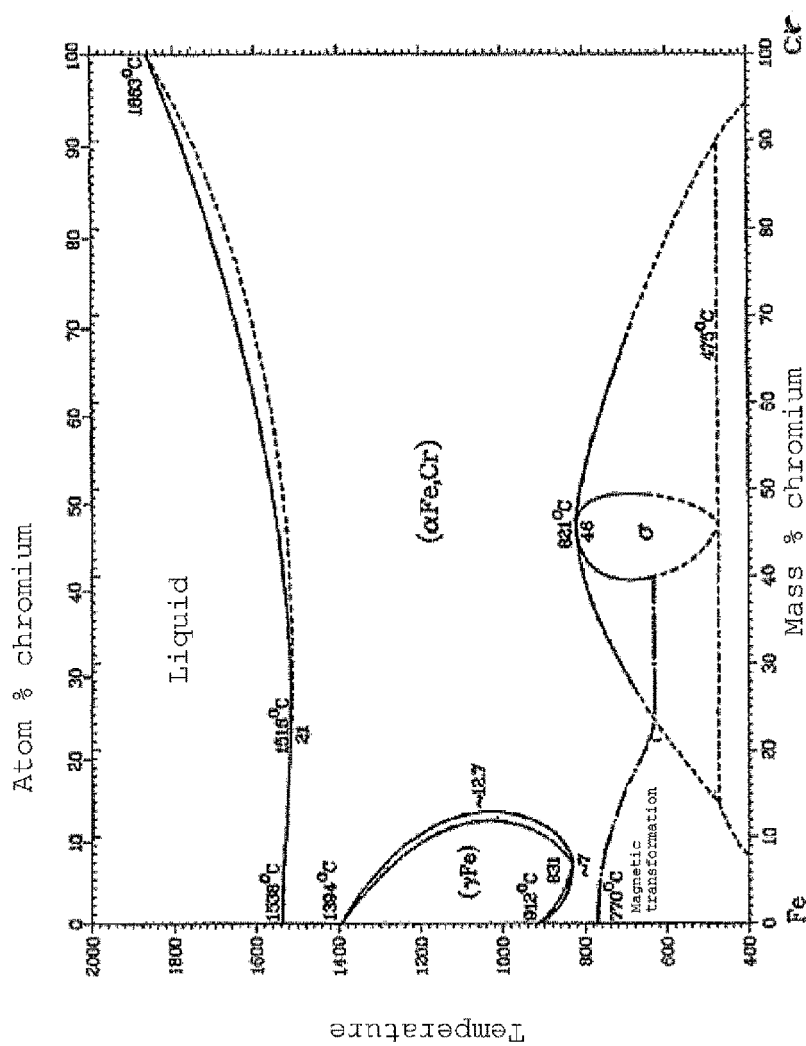
FIG. 3 shows a phase diagram of a Fe—Cr system.

The σ-phase, which is known for its embrittling effect and must therefore be avoided, is formed in the iron-chromium system. FIG. 3 shows the phase diagram in the Fe—Cr system. The σ-phase appears above 600° C. starting from 22% Cr. Even if the temperature of use lies above this range, the component passes through this range every time it is heated and cooled. It is therefore of advantage when the range in which the σ-phase is formed in an alloy lies at the lowest possible temperatures for the longest possible times. If further elements such as Mo or W, which according to Ralf Burgel, Handbook of High-Temperature Materials Engineering, 3rd Edition, Vieweg Verlag, Wiesbaden, 2006, page 349 to 350, Table 6.5, promote formation of the σ-phases, are added in significant proportions to an FeCr alloy, the effect on σ-phase formation should be considered more precisely.

With the JMatPro program of Thermotech, not only phase diagrams but also temperature-time-precipitation diagrams can be calculated. This part of the program can be used to estimate the possibilities of formation of the σ-phase. The Fe-data data bank of Thermotech were used as the database for the calculations.

Figure 4:
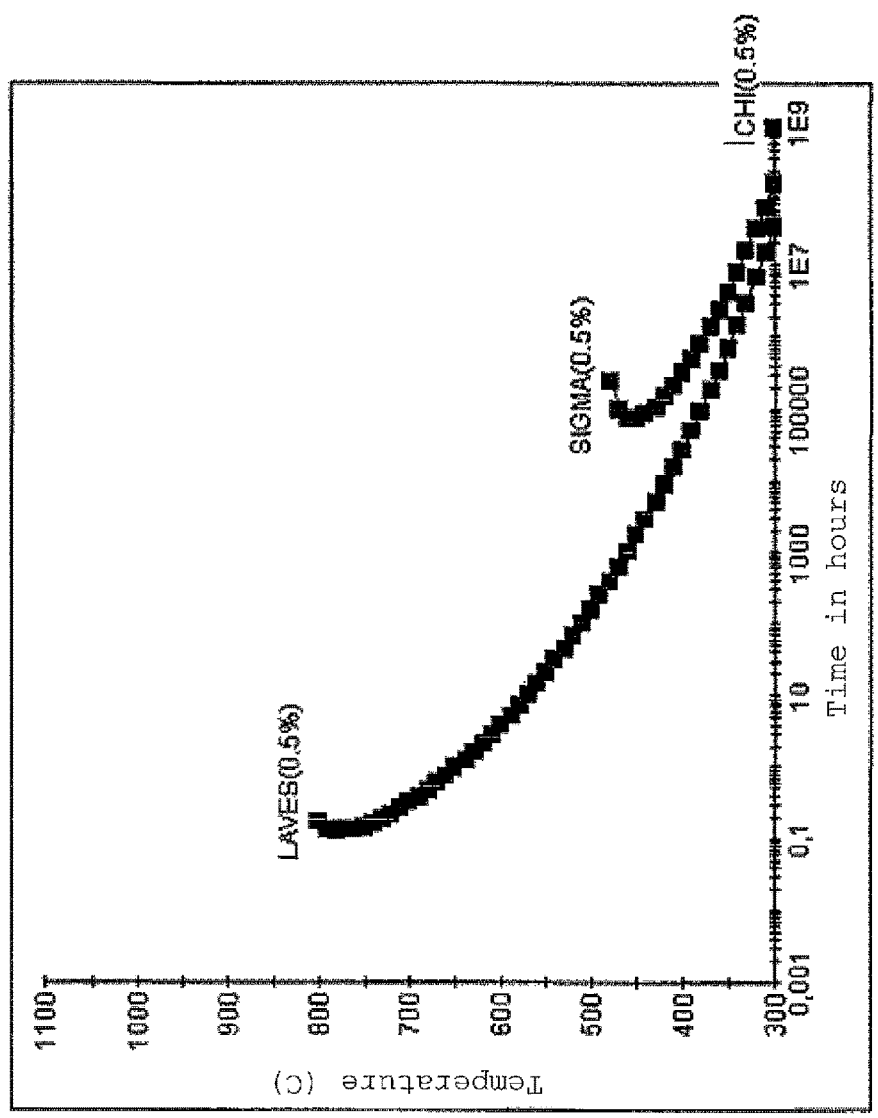
FIG. 4 shows temperature-time-precipitation diagrams calculated with JMPro for phases with an Mo precipitation greater than 0.5% after annealing at 1100°C. for Fe—18.5% Cr—3.3% Al—0.7% Nb—0.3% Si—0.15% Mn—0.002% C—0.007% N.

FIG. 4 shows the temperature-time-precipitation diagrams calculated with JMatPro for phases with an Mo proportion greater than 0.5% after annealing at 1100° C. for Fe—18.5% Cr—3.3% Al—0.7% Nb—0.3% Si—0.15% Mn—0.002% C—0.007% N. It is apparent that the σ-phase is formed only after longer than 100000 h at 450° C. The χ-phase appears only after even longer times.

Figure 5:
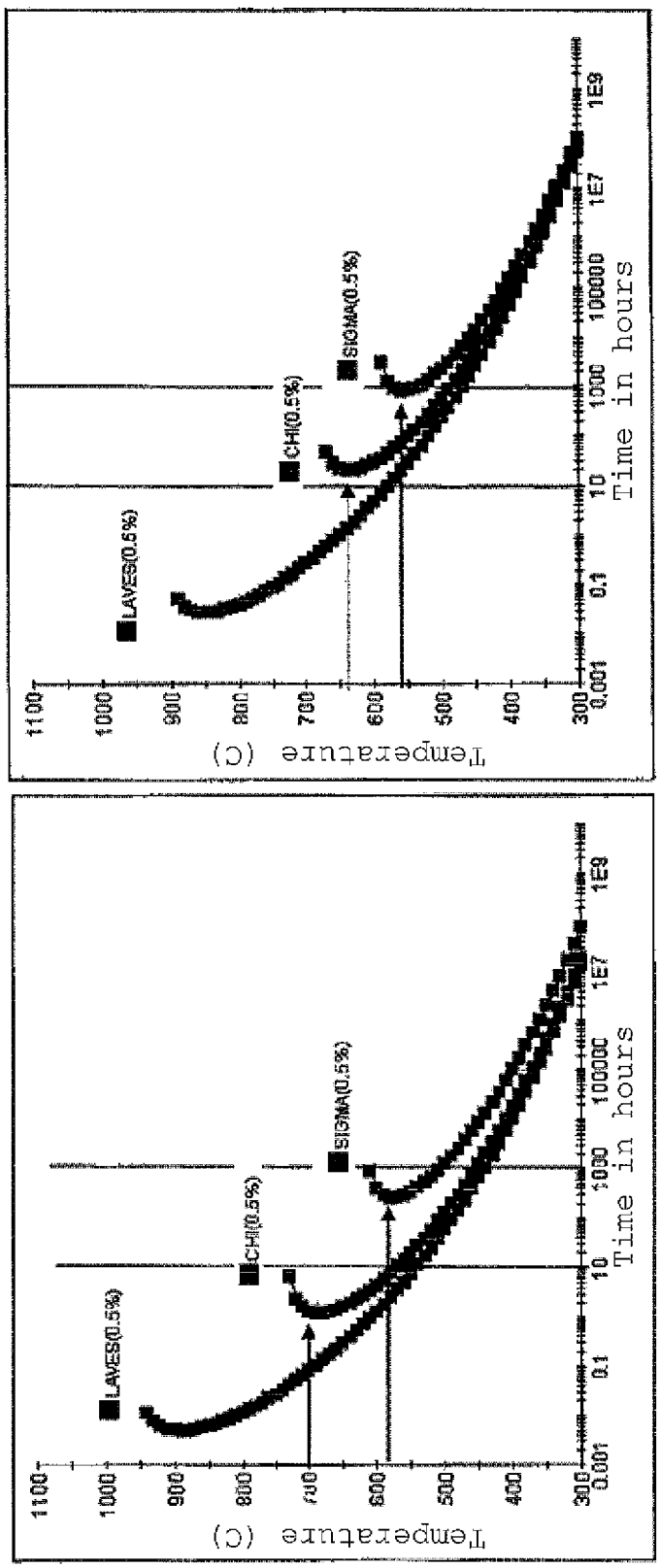
FIG. 5 shows temperature-time-precipitation greater than 0.5% after annealing at 1100°C. for Fe—18.5% Cr—3.3% Al—2% Mo—0.7% Nb—0.3% Si—0.15% Mn—0.007% N (left graph) and Fe—18.5% Cr—3.3% Al—2% W—0.7% Nb—0.3% Si—0.15% Mn—0.002% C—0.007% N (right graph).

FIG. 5 shows the temperature-time-precipitation diagrams calculated with JMatPro for phases with a proportion greater than 0.5% after annealing at 1100° C. for Fe—18.5% Cr—3.3% Al—2% Mo—0.7% Nb—0.3% Si—0.15% Mn—0.002% C—0.007% N (left graph) and Fe—18.5% Cr—3.3% Al—2% W—0.7% Nb—0.3% Si—0.15% Mn—0.002% C—0.007% N (right graph). For the addition of both elements, the time until the appearance of the σ-phase or χ-phase respectively is shortened. However, it is apparent that the formation of the σ-phase and that of the χ-phase occur at higher temperatures and in shorter times with addition of molybdenum than with addition of an equal proportion of tungsten (nose of the σ-phase for 2% W at 560° C. after 838 h and for 2% Mo at 580° C. already after 273 h; nose of the χ-phase for 2% W at 640° C. after 20.5 h and for 2% Mo at 685° C. already after 1.27 h). As far as avoidance of brittle phases such as the σ-phase or the χ-phase is concerned, addition of W must therefore be preferred to that of molybdenum.

Reason for the Limits

Chromium contents between 12 and 25 mass % do not have any decisive influence on the oxidation resistance in FeCrAl alloys, as can be read in J. Klöwer, Materials and Corrosion 51 (2000), pages 373 to 385. Nevertheless, a certain chromium content is necessary, since chromium promotes the formation of the particularly stable and protective α-$Al_2O_3$ layer. Therefore the lower limit lies at 12%. Chromium contents >25% make processing of the alloy more difficult.

An aluminum content of 2.0% is the minimum necessary (see DE 10157749 A1) for an FeCrAl alloy to be able to form a closed aluminum oxide layer. Al contents >4.5% make processing considerably more difficult.

The addition of Nb brings about the formation of a Laves phase of the type $Fe_2$(M, Si) or $Fe_7$(M, Si)$_6$. Thereby the good hot strength is enhanced, especially at low deformation rates. A minimum content of 0.25% is necessary for a marked improvement of the hot strength. If the Nb content is too high, the processability of the alloy is impaired. The upper limit therefore lies at 2% (see J. Froitzheim, G. H. Meier, L. Niewolak, P. J. Ennis, H. Hattendorf, L. Singheiser, W. J. Quadakkers, "Development of high strength ferritic steel for interconnect application in SOFCs", Journal of Power Sources 178 (2008) 163-173 and K. Yamamoto, Y. Kimura, F.-G. Wei, Y. Mishima, Design of Laves phase strengthened ferritic heat resisting steels in the Fe—Cr—Nb(Ni) system, Materials Science & Engineering. A. 329-331, Structural materials (2002, p. 249-254; N. Fujita, K. Ohmura, M. Kikuchi, T. Suzuki, S. Funaki, I. Hiroshige, Effect of Nb on high-temperature properties for ferritic stainless steel. Scripta Materialia, Vol. 35, No. 6 1996, pp. 705-710).

Tungsten increases the hot strength of the alloy, especially at 900° C., on the one hand by solid-solution strengthening and on the other hand by grain refining and further stabilization by the simultaneous action of Nb on Laves phase formation (see J. Froitzheim, G. H. Meier, L. Niewolak, P. J. Ennis, H. Hattendorf, L. Singheiser, W. J. Quadakkers, "Development of high strength ferritic steel for interconnect application in SOFCs", Journal of Power Sources 178 (2008) 163-173). A minimum content of 1% is necessary for a marked improvement of the hot strength. If the content is too high, the processability of the alloy is impaired. The upper limit therefore lies at 4%.

Addition of silicon stabilizes and promotes Laves phase formation (see J. Froitzheim, G. H. Meier, L. Niewolak, P. J. Ennis, H. Hattendorf, L. Singheiser, W. J. Quadakkers, "Development of high strength ferritic steel for interconnect application in SOFCs", Journal of Power Sources 178 (2008) 163-173, and Y. Hosoi, N. Wade, S. Kunimitsu, T. Urita, Effect of Si and Mn on the precipitation behavior of Laves phase and toughness of 9Cr-2Mo steel. Transactions of the Iron and Steel Institute of Japan 26 1986). Moreover, according to J. Klöwer, Materials and Corrosion 51 (2000), pages 373 to 385, the addition of silicon prolongs the useful life by improving the adhesion of the covering layer. A silicon content of at least 0.05 mass % is therefore necessary. If the Si contents are too high, they make processing of the alloy more difficult. The upper limit therefore lies at 1.2%.

For stabilization of the Laves phase, it is particularly favorable when the silicon content lies in a particular range as a function of the niobium content. This advantageous range is described by the following formula:

$$0.2*Nb \leq Si \leq 0.7*Nb \qquad \text{(Formula 2)},$$

where Si and Nb represent the alloying content of these elements in mass %.

The increase of hot strength is described in particular in a certain range as a function of the various additions that bring about an increase of hot strength. This advantageous range is described by the following two formulas:

$$36 < Cr+3*(Al+Si)+4.6*Mo+5.2*W+10*Nb \qquad \text{(Formula 1a)},$$

$$19 < Cr+4*Nb+21.6*\min(Si; 0.5*Nb) \qquad \text{(Formula 3a)},$$

where Cr, Al, Mo, W and Nb represent the alloying content of these elements in mass % and min(Si; 0.5*Nb) is the smaller of the values of Si and 0.5*Nb.

Formula 1 considers in particular the contributions of solid-solution strengthening to hot strength, Formula 3 in particular the contributions to higher strength at high temperatures, such as 900° C., preferably at very slow deformation rates such as $10^{-5}$ 1/s, which develop due to precipitates of an intermetallic phase of the type $Fe_2$(M, Si) or $Fe_7$(M, Si)$_6$.

A minimum manganese content of 0.01% is necessary to improve the processability. Manganese is limited to 0.7%, since this element reduces the oxidation resistance.

A minimum carbon content of 0.001% is necessary for good processability. C is limited to 0.03%, since this element reduces the elements that form the Laves phases, especially Nb, by carbide formation.

Even very low Mg contents improve processing due to binding of sulfur, thus preventing the occurrence of low-melting NiS eutectics. A minimum Mg content of 0.0001% is therefore necessary. If the contents are too high, intermetallic Ni—Mg phases may be formed and in turn significantly impair processability. The Mg content is therefore limited to 0.05%.

Just as Mg, even very low Ca contents already improve processing due to binding of sulfur, thus preventing the occurrence of low-melting NiS eutectics. A minimum Ca content of 0.0001% is therefore necessary. If the contents are too high, intermetallic Ni—Ca phases may be formed and in turn significantly impair processability. The Ca content is therefore limited to 0.03%.

The content of phosphorus should be lower than 0.030%, since this surface-active element impairs the oxidation resistance. If the P content is too low, the costs increase. The P content is therefore ≥0.001%.

Nitrogen reduces the oxidation resistance. The maximum nitrogen content should be 0.03%, in order to avoid not only the formation of nitrides that impair processability but also a reduction of oxidation resistance.

The sulfur contents should be adjusted as low as possible, since this surface-active element impairs the oxidation resistance. Therefore a maximum of 0.010% S is defined. Additions of oxygen-affine elements improve the oxidation resistance. They achieve this by being incorporated in the oxide layer, where they block the diffusion paths of oxygen at the grain boundaries.

A minimum Y content of 0.01% is practical for obtaining the enhancing effect of Y on the oxidation resistance. For cost reasons, the upper limit is set at 0.10%.

A minimum Hf content of 0.01% is expedient for obtaining the enhancing effect of Hf on the high-temperature strength and oxidation resistance. For cost reasons, the upper limit is set at 0.10% Hf.

A minimum Zr content of 0.01% is practical for obtaining the enhancing effect of Zr on the high-temperature strength and oxidation resistance. For cost reasons, the upper limit is set at 0.10% Zr.

Nickel is limited to max. 1.0%, since this element increases the costs. The same applies to cobalt.

Copper is limited to max. 0.5%, since this element reduces the oxidation resistance.

Boron improves the creep strength. Therefore a content of at least 0.0005% should be present. At the same time, this surface-active element impairs the oxidation resistance. A maximum of 0.008% boron is therefore defined.

The oxygen content must be lower than 0.010%, in order to ensure manufacturability. Too-low oxygen contents cause increased costs. The oxygen content should therefore be higher than 0.001% but lower than 0.01%.

Pb is limited to max. 0.002%, since this element reduces the oxidation resistance. The same applies for Zn and Sn.

TABLE 1

Composition (Part 1) of the investigated alloys. All data in mass %. Iron is the rest

| | Material Name | Batch | Cr | Ni | Mn | Si | Mo | Ti | Nb | Cu | Co | Al | W | F1 in % | F3 in % | 0.2*Nb in % | 0.7*Nb in % |
|---|---|---|---|---|---|---|---|---|---|---|---|---|---|---|---|---|---|
| T | Crofer 22 H | 161061 | 22.9 | 0.30 | 0.43 | 0.21 | 0.02 | 0.07 | 0.51 | 0.02 | 0.04 | 0.02 | 1.94 | 31.2 | 30.0 | 0.102 | 0.357 |
| T | Crofer 22 H | 161995 | 22.6 | 0.22 | 0.43 | 0.24 | 0.02 | 0.06 | 0.49 | 0.02 | 0.02 | 0.019 | 1.97 | 30.7 | 30.1 | 0.098 | 0.343 |
| T | Aluchrom W | 161138 | 14.9 | 0.11 | 0.38 | 0.21 | 0.01 | <0.01 | 0.01 | 0.02 | 0.02 | 4.69 | — | 19.7 | 15.1 | 0.002 | 0.007 |
| T | Aluchrom W | 161927 | 14.7 | 0.16 | 0.28 | 0.16 | 0.01 | <0.01 | 0.01 | 0.03 | 0.02 | 4.43 | — | 19.2 | 14.8 | 0.002 | 0.007 |
| T | Aluchrom W | 162118 | 14.9 | 0.13 | 0.38 | 0.22 | 0.01 | <0.01 | 0.01 | 0.03 | 0.02 | 4.54 | — | 19.5 | 15.0 | 0.002 | 0.007 |
| T | Aluchrom 418 YHF | 162210 | 18.3 | 0.17 | 0.19 | 0.17 | 0.01 | 0.01 | 0.01 | 0.03 | 0.02 | 4.21 | — | 22.6 | 18.5 | 0.002 | 0.007 |
| T | Aluchrom 418 YHF | 162211 | 18.4 | 0.16 | 0.17 | 0.15 | 0.01 | 0.01 | 0.01 | 0.04 | 0.02 | 4.36 | — | 22.9 | 18.6 | 0.002 | 0.007 |
| E | FeCrAlWNb | 2230 | 18.87 | 0.02 | 0.39 | 0.28 | 0.01 | 0.008 | 0.46 | 0.02 | 0.01 | 3.40 | 2.02 | 30.3 | 26.0 | 0.092 | 0.322 |
| E | FeCrAlWNb | 250023 | 18.82 | 0.03 | 0.14 | 0.10 | 0.001 | 0.003 | 1.00 | <0.01 | 0.07 | 3.44 | 2.04 | 34.3 | 27.1 | 0.200 | 0.700 |
| E | FeCrAlMoNb | 250021 | 19.05 | 0.03 | 0.15 | 0.30 | 1.94 | 0.002 | 0.73 | <0.01 | <0.01 | 3.48 | 0.10 | 32.6 | 29.2 | 0.146 | 0.511 |
| E | FeCrAlMoNb | 250030 | 18.43 | 0.02 | 0.15 | 0.31 | 2.00 | 0.009 | 0.72 | 0.01 | <0.01 | 3.27 | 0.01 | 31.6 | 28.7 | 0.144 | 0.504 |
| E | FeCrAlWMoNb | 250026 | 18.97 | 0.02 | 0.14 | 0.31 | 0.90 | 0.002 | 0.67 | <0.01 | 0.27 | 3.61 | 1.94 | 34.0 | 28.9 | 0.134 | 0.469 |
| E | FeCrAlWMoNb | 250031 | 19.00 | 0.03 | 0.15 | 0.31 | 1.03 | 0.007 | 0.68 | 0.01 | 0.01 | 3.30 | 2.01 | 34.3 | 29.0 | 0.136 | 0.476 |
| V | FeCrAlCo | 250019 | 18.75 | 0.03 | 0.15 | 0.30 | 0.001 | 0.006 | 0.95 | <0.01 | 2.8 | 3.34 | 0.01 | 29.1 | 30.3 | 0.190 | 0.665 |
| V | FeCrAlCo | 250025 | 18.77 | 0.04 | 0.15 | 0.25 | 0.020 | 0.003 | 0.61 | <0.01 | 2.97 | 3.32 | 0.01 | 26.6 | 27.2 | 0.122 | 0.427 |
| V | FeCrAlCo | 250035 | 18.75 | 0.03 | 0.17 | 0.27 | 0.020 | 0.035 | 0.68 | <0.01 | 3.04 | 3.37 | 0.12 | 27.4 | 28.0 | 0.136 | 0.476 |

T: Alloys according to the prior art, V: non-inventive alloys, E: inventive alloys
F1 = Calculation of the right side of Formula 1a or 1b; F3 = Calculation of the right side of Formula 3a or 3b

TABLE 2

Composition (Part 2) of the investigated alloys. All data in mass %. Iron is the rest

| | Material | Batch | C | S | N | P | Mg | Ca | La | Y | Zr | Hf | O |
|---|---|---|---|---|---|---|---|---|---|---|---|---|---|
| T | Crofer 22 H | 161061 | 0.007 | <0.002 | 0.015 | 0.014 | <0.01 | <0.01 | 0.079 | — | 0.004 | — | 0.002 |
| T | Crofer 22 H | 161995 | 0.009 | <0.002 | 0.018 | 0.017 | <0.01 | <0.01 | 0.049 | — | — | — | 0.002 |
| T | Aluchrom W | 161138 | 0.019 | <0.002 | 0.002 | 0.014 | <0.01 | 0.001 | — | — | 0.20 | — | 0.002 |
| T | Aluchrom W | 161927 | 0.019 | <0.002 | 0.006 | 0.014 | <0.01 | 0.002 | — | — | 0.15 | — | 0.002 |
| T | Aluchrom W | 162118 | 0.017 | <0.002 | 0.006 | 0.013 | <0.01 | 0.001 | — | — | 0.15 | — | 0.002 |
| T | Aluchrom 418 YHF | 162210 | 0.012 | <0.002 | 0.004 | 0.015 | <0.001 | <0.01 | — | 0.07 | 0.04 | 0.04 | 0.002 |
| T | Aluchrom 418 YHF | 162211 | 0.014 | <0.002 | 0.008 | 0.015 | <0.001 | <0.01 | — | 0.05 | 0.04 | 0.05 | 0.002 |
| E | FeCrAlWNb | 2230 | 0.0024 | 0.0015 | 0.008 | 0.017 | 0.0006 | 0.0002 | — | 0.042 | 0.043 | 0.032 | 0.002 |
| E | FeCrAlWNb | 250023 | 0.002 | 0.004 | 0.007 | 0.018 | 0.0006 | 0.0002 | — | 0.070 | 0.051 | 0.051 | 0.001 |
| E | FeCrAlMoNb | 250021 | 0.002 | 0.005 | 0.007 | 0.018 | 0.0006 | 0.0002 | — | 0.068 | 0.053 | 0.060 | 0.001 |
| E | FeCrAlMoNb | 250030 | 0.002 | 0.0025 | 0.01 | 0.014 | 0.0007 | 0.0002 | — | 0.057 | 0.051 | 0.051 | 0.002 |
| E | FeCrAlWMoNb | 250026 | 0.004 | 0.002 | 0.006 | 0.018 | 0.0005 | 0.0002 | — | 0.048 | 0.053 | 0.058 | 0.002 |
| E | FeCrAlWMoNb | 250031 | 0.0014 | 0.003 | 0.007 | 0.016 | 0.0005 | 0.0002 | — | 0.054 | 0.048 | 0.057 | 0.001 |
| V | FeCrAlCo | 250019 | 0.002 | 0.002 | 0.008 | 0.017 | 0.0006 | 0.0002 | — | 0.046 | 0.049 | 0.053 | 0.002 |
| V | FeCrAlCo | 250025 | 0.0013 | 0.002 | 0.004 | 0.015 | 0.0004 | 0.0002 | — | 0.033 | 0.048 | 0.050 | 0.004 |
| V | FeCrAlCo | 250035 | 0.002 | 0.003 | 0.005 | 0.017 | 0.0003 | 0.0002 | — | 0.043 | 0.047 | 0.055 | 0.001 |

T: Alloys according to the prior art, V: non-inventive alloys, E: inventive alloys

TABLE 3

Mechanical characteristics at room temperature

| | Material | Batch | F1 in % | F3 in % | Si in % | Formula 2 in % 0.2*Nb | Formula 2 in % 0.7*Nb | Thickness in mm | Rp0.2 in MPA | Rm in MPA | A50 in % | Grain size in μm | Recrystallization in % |
|---|---|---|---|---|---|---|---|---|---|---|---|---|---|
| T | Crofer 22 H | 161061 | 29.8 | 15.1 | 0.21 | 0.102 | 0.357 | 1.53 | 385 | 541 | 27 | 42 | 100 |
| T | Crofer 22 H | 161061 | 29.8 | 15.1 | 0.21 | 0.102 | 0.357 | 0.31 | 363 | 535 | 21 | 21 | 95 |
| T | Aluchrom W | 161138 | 29.8 | 15.1 | 0.21 | 0.002 | 0.007 | 1.51 | 450 | 554 | 20 | | |
| T | Aluchrom W | 161927 | 28.6 | 14.8 | 0.16 | 0.002 | 0.007 | 0.419 | 469 | 600 | 23.4 | 12 | 95 |
| T | Aluchrom W | 162118 | 29.3 | 15.0 | 0.22 | 0.002 | 0.007 | 0.395 | 461 | 571 | 26.5 | 19 | 100 |
| T | Aluchrom 418 YHF | 162210 | 31.6 | 18.5 | 0.17 | 0.002 | 0.007 | 1.50 | 422 | 543 | 21 | 15 | 80 |
| T | Aluchrom 418 YHF | 162211 | 32.1 | 18.6 | 0.15 | 0.002 | 0.007 | 0.228 | 492 | 580 | 23 | 12 | 95 |
| E | FeCrAlWNb | 2230 | 45.1 | 25.7 | 0.28 | 0.092 | 0.322 | 1.50 | 430 | 579 | 24 | 37 | 99 |
| E | FeCrAlWNb | 2230 | 45.1 | 25.7 | 0.28 | 0.092 | 0.322 | 0.30 | 444 | 603 | 25 | 20 | 100 |
| E | FeCrAlWNb | 250023 | 50.1 | 25.0 | 0.10 | 0.200 | 0.700 | 1.50 | 436 | 597 | 26 | 31 | 100 |
| E | FeCrAlMoNb | 250021 | 47.1 | 28.5 | 0.30 | 0.146 | 0.511 | 1.50 | 459 | 614 | 25 | 33 | 100 |
| E | FeCrAlMoNb | 250030 | 45.6 | 28.0 | 0.31 | 0.144 | 0.504 | 1.50 | 450 | 606 | 26 | 35 | 100 |
| E | FeCrAlWMoNb | 250026 | 51.7 | 28.4 | 0.31 | 0.134 | 0.469 | 1.50 | 458 | 621 | 25 | 49 | 100 |
| E | FeCrAlWMoNb | 250031 | 51.8 | 28.4 | 0.31 | 0.136 | 0.476 | 1.50 | 450 | 609 | 24 | 48 | 100 |
| V | FeCrAlCo | 250019 | 39.2 | 29.0 | 0.30 | 0.190 | 0.665 | 1.50 | 415 | 577 | 18 | 86 | 100 |
| V | FeCrAlCo | 250025 | 35.7 | 26.6 | 0.25 | 0.122 | 0.427 | 1.50 | 403 | 560 | 25 | 69 | 100 |
| V | FeCrAlCo | 250035 | 37.2 | 27.3 | 0.27 | 0.136 | 0.476 | 1.50 | 411 | 578 | 27 | 66 | 100 |

T: Alloys according to the prior art, V: non-inventive alloys, E: inventive alloys
F1 = Calculation of the right side of Formula 1a or 1b; F3 = Calculation of the right side of Formula 3a or 3b

TABLE 4

Tension tests at 900° C.

| | Material | Batch | F1 in % | F3 in % | Si in % | Formula 2 in % 0.2*Nb | Formula 2 in % 0.7*Nb | Thickness in mm | V = $10^{-3}$ 1/s Rm in MPA | V = $10^{-3}$ 1/s A50 in % | V = $10^{-5}$ 1/3 Rm in MPA | V = $10^{-5}$ 1/3 A50 in % |
|---|---|---|---|---|---|---|---|---|---|---|---|---|
| T | Crofer 22 H | 161061 | 29.8 | 15.1 | 0.21 | 0.102 | 0.357 | 1.53 | 33.8-35.8 | >40 | 16.6-20.5 | >30 |
| T | Crofer 22 H | 161995 | 38.6 | 29.7 | 0.24 | 0.102 | 0.357 | 0.31 | 36.5 | >40 | 18.9 | >30 |
| T | Aluchrom W | 161138 | 29.8 | 15.1 | 0.21 | 0.002 | 0.007 | 1.51 | 31.7 | >40 | 8.3 | >30 |
| T | Aluchrom W | 161927 | 28.6 | 14.8 | 0.16 | 0.002 | 0.007 | 0.419 | 25.9 | >40 | 11.4 | >30 |
| T | Aluchrom W | 162118 | 29.3 | 15.0 | 0.22 | 0.002 | 0.007 | 0.395 | | | | |
| T | Aluchrom 418 YHF | 162210 | 31.6 | 18.5 | 0.17 | 0.002 | 0.007 | 1.50 | 27.4 | >40 | 8.3 | >30 |
| T | Aluchrom 418 YHF | 162211 | 32.1 | 18.6 | 0.15 | 0.002 | 0.007 | 0.228 | 24.0 | >40 | 12.7 | >30 |
| E | FeCrAlWNb | 2230 | 45.1 | 25.7 | 0.28 | 0.092 | 0.322 | 1.50 | 40.0 | >40 | 14.9-18.9 | >30 |
| E | FeCrAlWNb | 250023 | 50.1 | 25.0 | 0.10 | 0.200 | 0.700 | 1.50 | 41.5 | >40 | 15.7 | >30 |
| E | FeCrAlMoNb | 250021 | 47.1 | 28.5 | 0.30 | 0.146 | 0.511 | 1.50 | | | | |
| E | FeCrAlMoNb | 250030 | 45.6 | 28.0 | 0.31 | 0.144 | 0.504 | 1.50 | 42.1 | >40 | 17.9 | >30 |
| E | FeCrAlWMoNb | 250026 | 51.7 | 28.4 | 0.31 | 0.134 | 0.469 | 1.50 | | | | |
| E | FeCrAlWMoNb | 250031 | 51.8 | 28.4 | 0.31 | 0.136 | 0.476 | 1.50 | 44.3 | >40 | 17.1 | >30 |
| V | FeCrAlCo | 250019 | 39.2 | 29.0 | 0.30 | 0.190 | 0.665 | 1.50 | | | | |
| V | FeCrAlCo | 250025 | 35.7 | 26.6 | 0.25 | 0.122 | 0.427 | 1.50 | | | | |
| V | FeCrAlCo | 250035 | 37.2 | 27.3 | 0.27 | 0.136 | 0.476 | 1.50 | 33.3 | >40 | 16.2 | >30 |

T: Alloys according to the prior art, V: non-inventive alloys, E: inventive alloys
F1 = Calculation of the right side of Formula 1a or 1b; F3 = Calculation of the right side of Formula 3a or 3b

TABLE 5

Offset compressive yield strength $R_{p0.2}$ at 900° C.

| | Material | Batch | F1 in % | F3 in % | Si in % | Formula 2 in % 0.2*Nb | Formula 2 in % 0.7*Nb | Time in h | V = $10^{-3}$ 1/s $R_{p0.2}$ in MPA |
|---|---|---|---|---|---|---|---|---|---|
| T | Crofer 22 H | 161061 | 38.9 | 29.5 | 0.21 | 0.102 | 0.357 | 1 | 46.3 |
| E | Fe19CrAlWNb | 250023 | 50.1 | 25.0 | 0.10 | 0.200 | 0.700 | 1 | 61.9 |
| E | Fe19CrAlMoNb | 250030 | 45.6 | 28.0 | 0.31 | 0.144 | 0.504 | 1 | 66 |
| E | Fe19CrAlWMoNb | 250031 | 51.8 | 28.4 | 0.31 | 0.136 | 0.476 | 1 | 63.7 |
| V | FeCrAlCo | 250035 | 37.2 | 27.3 | 0.27 | 0.136 | 0.476 | 1 | 48.5 |

T: Alloys according to the prior art, V: non-inventive alloys, E: inventive alloys
F1 = Calculation of the right side of Formula 1a or 1b; F3 = Calculation of the right side of Formula 3a or 3b

LIST OF REFERENCE NUMBERS

FIG. 1 Net change in mass during oxidation of the alloys from Tables 1 and 2 in laboratory air at 900° C. with a cycle of 96 hours. Each measured point is the mean value of 3 specimens.

FIG. 2 Offset compressive yield strength tests of alloys from Tables 1 and 2 at 900° C. as a function of aging time.

FIG. 3 Fe—Cr phase diagram from T. B. Massalski, "Binary Alloys Phase Diagrams", Volume 1, ASM (1987), page 228.

FIG. 4 Temperature-time-precipitation diagrams for phases with a proportion greater than 0.5% after annealing at 1100° C. for Fe—18.5% Cr—3.3% Al—0.7% Nb—0.3% Si—0.15% Mn—0.002% C—0.007% N (left graph).

FIG. 5 Temperature-time-precipitation diagrams for phases with a proportion greater than 0.5% after annealing at 1100° C. for Fe—18.5% Cr—3.3% Al—2% Mo—0.7% Nb—0.3%Si—0.15% Mn—0.002% C—0.007% N (left graph) Fe—18.5% Cr—3.3% Al—2% W—0.7% Nb—0.3% Si—0.15% Mn—0.002% C—0.007% N (right graph)

The invention claimed is:

1. A solid oxide fuel cell comprising
an interconnector plate, the interconnector plate comprising a nonconductive part,
the nonconductive part comprising a part of said interconnector plate of said solid oxide fuel cell and being an iron-chromium-aluminum alloy,
with (in mass %) 3.0 to 4.5% Al, 16 to 23% Cr, 1.0 to 4% W, 0.25 to 2.0% Nb, 0.05 to 1.2% Si, 0.001 to 0.70% Mn, 0.001 to 0.030% C, 0.0001 to 0.05% Mg, 0.0001 to 0.03% Ca, 0.001 to 0.030% P, max. 0.03% N, max. 0.01% S, additionally containing 0.01 to 0.10% yttrium, 0.01 to 0.10% hafnium; 0.01 to 0.10% zirconium, wherein W can be replaced by 1 to 4% Mo, wherein Y can be replaced completely or partly by 0.01 to 0.10% of at least one of the elements Sc and/or La and/or cerium and wherein Hf or Zr can be replaced completely or partly by 0.01 to 0.1% of the element Ti, optionally further containing at most 1.0% nickel, at most 1.0% Co, at most 0.5% copper, at most 0.1% vanadium, 0.001 to 0.010% oxygen and/or 0.0001-0.008% boron, the rest iron and, wherein the alloy satisfies the following formulas:
36% <Cr+3*(Al+Si)+4.6*Mo+5.2*W+10*Nb, where Cr, Al, Si, Mo, W and Nb represent the alloying content of these elements in mass % (Formula 1a),
0.2* Nb≤Si≤0.7* Nb, where Si and Nb represent the alloying content of these elements in mass % (Formula 2),
19% <Cr+4*Nb+21.6* min(Si;0.5*Nb), where Cr, Si and Nb represent the alloying content of these elements in mass % and min(Si;0.5*Nb) is the smaller of the values of Si and 0.5*Nb (Formula 3a).

2. The solid oxide fuel cell according to claim 1, wherein the alloy has a silicon content (in mass %) of 0.05 to 1.0%.

3. The solid oxide fuel cell according to claim 1, wherein the alloy has a carbon content (in mass %) of 0.002 to 0,020%.

4. The solid oxide fuel cell according to claim 1, wherein the alloy has a tungsten content (in mass %) of 1.5 to 3%.

5. The solid oxide fuel cell according to claim 1, wherein the alloy has (in mass %) 0.0001 to 0.03% Mg and 0.0001 to 0.02% Ca.

6. The solid oxide fuel cell according to claim 1, wherein the alloy has (in mass %) 0.010 to 0.25% P.

7. A solid oxide fuel cell comprising a first component selected from the group consisting of a reformer and a heat exchanger,
wherein the reformer or the heat exchanger comprises an iron-chromium-aluminum alloy, with (in mass %) 3.0 to 4.5% Al, 16 to 23% Cr, 1.0 to 4% W, 0.25 to 2.0% Nb, 0.05 to 1,2% Si, 0.001 to 0.70% Mn, 0.001 to 0.030% C, 0.0001 to 0.05% Mg, 0.0001 to 0.03% Ca, 0.001 to 0.030% P, max. 0.03% N, max. 0.01% S, additionally containing 0.01 to 0.10% yttrium, 0.01 to 0.10% hafnium; 0.01 to 0.10% zirconium, wherein W can be replaced by 1 to 4% Mo, wherein Y can be replaced completely or partly by 0.01 to 0.10% of at least one of the elements Sc and/or La and/or cerium and wherein Hf or Zr can be replaced completely or partly by 0.01 to 0.1% of the element Ti, if necessary optionally further containing at most 1.0% nickel, at most 1.0% Co, at most 0.5% copper, at most 0.1% vanadium, 0.001 to 0.010% oxygen and/or 0.0001-0.008% boron, the rest iron and, wherein the alloy satisfies the following formulas:
36% <Cr+3*(Al+Si)+4.6*Mo+5.2*W+10*Nb, where Cr, Al, Si, Mo, W and Nb represent the alloying content of these elements in mass % (Formula 1a),
0.2* Nb<Si<0.7* Nb, where Si and Nb represent the alloying content of these elements in mass % (Formula 2),
19% <Cr+4*Nb+21.6* min(Si;0.5*Nb), where Cr, Si and Nb represent the alloying content of these elements in mass % and min(Si;0.5*Nb) is the smaller of the values of Si and 0.5*Nb (Formula 3a).

8. The solid oxide fuel cell according to claim 7, wherein the alloy has a silicon content (in mass %) of 0.05 to 1.0%.

9. The solid oxide fuel cell according to claim 7, wherein the alloy has a carbon content (in mass %) of 0.002 to 0.020%.

10. The solid oxide fuel cell according to claim 7, wherein the alloy has a tungsten content (in mass %) of 1.5 to 3%.

11. The solid oxide fuel cell according to claim 7, wherein the alloy has (in mass %) 0.0001 to 0.03% Mg and 0.0001 to 0.02% Ca.

12. The solid oxide fuel cell according to claim 7, wherein the alloy has (in mass %) 0.010 to 0.25% P.

* * * * *